US012705357B2

(12) United States Patent
Morita et al.

(10) Patent No.: US 12,705,357 B2
(45) Date of Patent: Aug. 11, 2026

(54) SYSTEMS AND METHODS FOR SECURE STARTUP OF ARITHMETIC PROCESSING DEVICES

(71) Applicant: HITACHI ASTEMO, LTD., Hitachinaka (JP)

(72) Inventors: Nobuyoshi Morita, Tokyo (JP); Masashi Yano, Tokyo (JP); Shuhei Kaneko, Tokyo (JP); Yasuhiro Fujii, Tokyo (JP); Mikio Kataoka, Tokyo (JP); Teruaki Nomura, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 273 days.

(21) Appl. No.: 18/258,392

(22) PCT Filed: Aug. 23, 2021

(86) PCT No.: PCT/JP2021/030789
§ 371 (c)(1),
(2) Date: Jun. 20, 2023

(87) PCT Pub. No.: WO2022/185570
PCT Pub. Date: Sep. 9, 2022

(65) Prior Publication Data

US 2024/0020386 A1 Jan. 18, 2024

(30) Foreign Application Priority Data

Mar. 2, 2021 (JP) ................................ 2021-032856

(51) Int. Cl.
*G06F 21/57* (2013.01)
*G06F 21/64* (2013.01)

(52) U.S. Cl.
CPC ............. *G06F 21/57* (2013.01); *G06F 21/64* (2013.01); *G06F 2221/034* (2013.01)

(58) Field of Classification Search
CPC ..... G06F 21/57; G06F 21/64; G06F 2221/034
See application file for complete search history.

(56) References Cited

U.S. PATENT DOCUMENTS 8,438,658 B2 * 5/2013 Hofstee .............. G06Q 20/3674 705/56
11,836,048 B2 * 12/2023 Yamashita .......... G06F 11/1458
(Continued)

FOREIGN PATENT DOCUMENTS

JP 2019-212114 A 12/2019
JP 2020-047064 A 3/2020
(Continued)

OTHER PUBLICATIONS

International Search Report with English Translation and Written Opinion of International Patent Application No. PCT/JP2021/030789 dated Sep. 28, 2021 (9 pages).

*Primary Examiner* — Carl G Colin
*Assistant Examiner* — Zhe Liu
(74) *Attorney, Agent, or Firm* — Foley & Lardner LLP

(57) ABSTRACT

The present disclosure generally relates to systems and methods for safe startup, comprising a control apparatus. The control apparatus includes a first arithmetic processing device for executing a first program, a second arithmetic processing device for executing a second program, and a storage device for storing the second program. The first arithmetic processing device is configured to: verify whether each of the first program and the second program has been falsified, acquire the second program from the storage device when the verification unit verifies that the first program is not falsified, and notify the second microcomputer of startup permission of the second program when the verification unit verifies that the second program is not falsified, wherein the second arithmetic processing device
(Continued)

acquires the second program from the storage device and starts up the second program when a notification of the startup permission is issued.

6 Claims, 5 Drawing Sheets

(56) References Cited

U.S. PATENT DOCUMENTS

| | | | | |
|---|---|---|---|---|
| 2015/0150127 | A1* | 5/2015 | Ning | G06F 21/57<br>726/22 |
| 2019/0172047 | A1* | 6/2019 | Tan | G06F 21/32 |
| 2019/0289154 | A1* | 9/2019 | Konosu | H04N 1/0088 |
| 2020/0099815 | A1 | 3/2020 | Ono | |
| 2020/0151336 | A1* | 5/2020 | Maletsky | G06F 21/575 |
| 2020/0167472 | A1* | 5/2020 | Hertenstein | H04L 9/3236 |
| 2020/0293662 | A1* | 9/2020 | Gupta | G06F 8/654 |
| 2020/0311279 | A1* | 10/2020 | Goda | G06F 21/575 |
| 2020/0334360 | A1* | 10/2020 | Inaba | G06F 21/572 |
| 2021/0012011 | A1* | 1/2021 | Huang | G06F 21/79 |
| 2022/0092189 | A1* | 3/2022 | Fong | G06F 21/572 |
| 2022/0224546 | A1* | 7/2022 | Cao | H04L 9/006 |
| 2024/0111872 | A1* | 4/2024 | Gilton | G06F 21/44 |
| 2024/0134709 | A1* | 4/2024 | Mansbart | G06F 9/544 |

FOREIGN PATENT DOCUMENTS

| | | |
|---|---|---|
| JP | 2020-140561 A | 9/2020 |
| JP | 2020-154601 A | 9/2020 |

* cited by examiner

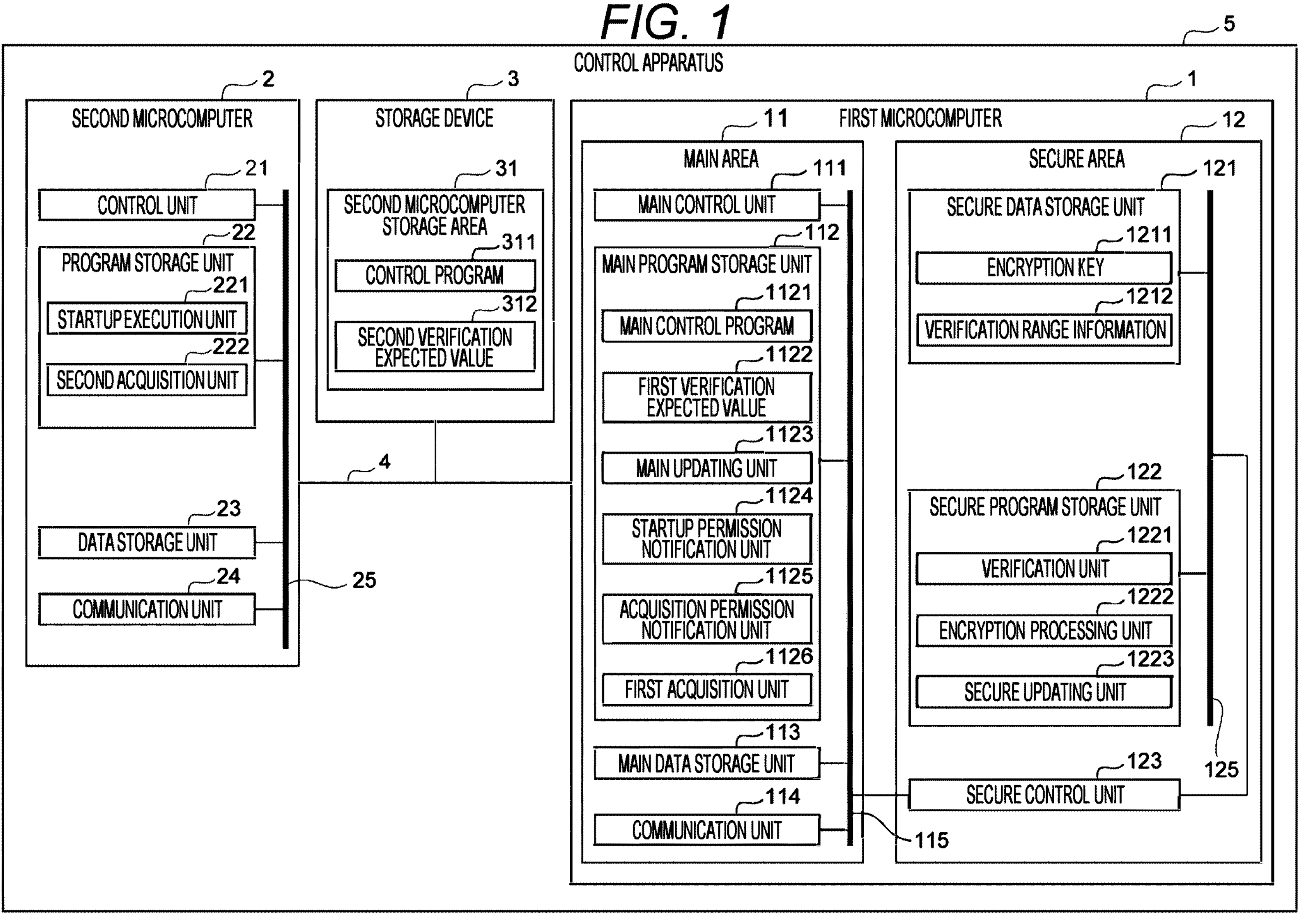
FIG. 1
CONTROL APPARATUS
5
SECOND MICROCOMPUTER
2
CONTROL UNIT
21
PROGRAM STORAGE UNIT
22
STARTUP EXECUTION UNIT
221
SECOND ACQUISITION UNIT
222
DATA STORAGE UNIT
23
COMMUNICATION UNIT
24
25
STORAGE DEVICE
3
SECOND MICROCOMPUTER STORAGE AREA
31
CONTROL PROGRAM
311
SECOND VERIFICATION EXPECTED VALUE
312
4
FIRST MICROCOMPUTER
1
MAIN AREA
11
MAIN CONTROL UNIT
111
MAIN PROGRAM STORAGE UNIT
112
MAIN CONTROL PROGRAM
1121
FIRST VERIFICATION EXPECTED VALUE
1122
MAIN UPDATING UNIT
1123
STARTUP PERMISSION NOTIFICATION UNIT
1124
ACQUISITION PERMISSION NOTIFICATION UNIT
1125
FIRST ACQUISITION UNIT
1126
MAIN DATA STORAGE UNIT
113
COMMUNICATION UNIT
114
115
SECURE AREA
12
SECURE DATA STORAGE UNIT
121
ENCRYPTION KEY
1211
VERIFICATION RANGE INFORMATION
1212
SECURE PROGRAM STORAGE UNIT
122
VERIFICATION UNIT
1221
ENCRYPTION PROCESSING UNIT
1222
SECURE UPDATING UNIT
1223
SECURE CONTROL UNIT
123
125

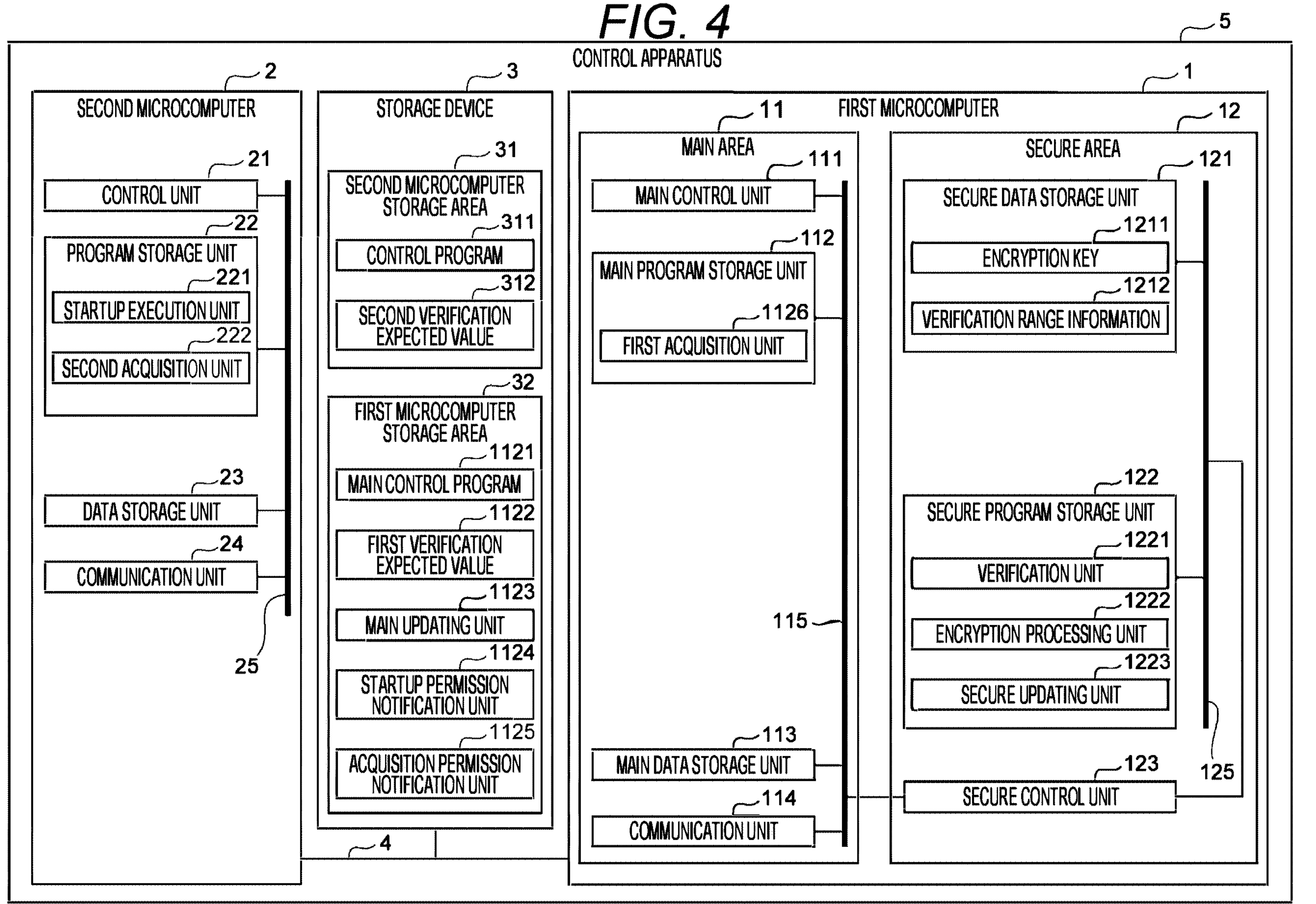
FIG. 4
5
CONTROL APPARATUS
2
SECOND MICROCOMPUTER
21
CONTROL UNIT
22
PROGRAM STORAGE UNIT
221
STARTUP EXECUTION UNIT
222
SECOND ACQUISITION UNIT
23
DATA STORAGE UNIT
24
COMMUNICATION UNIT
25
3
STORAGE DEVICE
31
SECOND MICROCOMPUTER STORAGE AREA
311
CONTROL PROGRAM
312
SECOND VERIFICATION EXPECTED VALUE
32
FIRST MICROCOMPUTER STORAGE AREA
1121
MAIN CONTROL PROGRAM
1122
FIRST VERIFICATION EXPECTED VALUE
1123
MAIN UPDATING UNIT
1124
STARTUP PERMISSION NOTIFICATION UNIT
1125
ACQUISITION PERMISSION NOTIFICATION UNIT
4
1
FIRST MICROCOMPUTER
11
MAIN AREA
111
MAIN CONTROL UNIT
112
MAIN PROGRAM STORAGE UNIT
1126
FIRST ACQUISITION UNIT
115
113
MAIN DATA STORAGE UNIT
114
COMMUNICATION UNIT
12
SECURE AREA
121
SECURE DATA STORAGE UNIT
1211
ENCRYPTION KEY
1212
VERIFICATION RANGE INFORMATION
122
SECURE PROGRAM STORAGE UNIT
1221
VERIFICATION UNIT
1222
ENCRYPTION PROCESSING UNIT
1223
SECURE UPDATING UNIT
125
123
SECURE CONTROL UNIT

SYSTEMS AND METHODS FOR SECURE STARTUP OF ARITHMETIC PROCESSING DEVICES

TECHNICAL FIELD

The present invention relates to a control apparatus.

BACKGROUND ART

For example, an in-vehicle control apparatus that controls a vehicle is equipped with a secure boot function of verifying safety of a program when an arithmetic processing device such as a microcontroller is started up. In order to improve the safety of the secure boot function, it is preferable to mount a security function of a dedicated module having tamper resistance such as a hardware security module (HSM) in the arithmetic processing device. On the other hand, since the control apparatus includes a plurality of arithmetic processing devices, when the security function such as the HSM is mounted in all of the plurality of arithmetic processing devices, the cost of the control apparatus greatly increases.

For example, a technique disclosed in PTL 1 is known as a technique for realizing safe startup of a control apparatus without mounting a security function such as an HSM in all of a plurality of arithmetic processing devices. PTL 1 discloses a secure boot technique of a device including two arithmetic processing devices, and discloses a technique in which one arithmetic processing device verifies, at the time of startup, whether or not a program executed in the other arithmetic processing device is falsified.

CITATION LIST

Patent Literature

PTL 1: JP 2020-047064 A

SUMMARY OF INVENTION

Technical Problem

However, PTL 1 does not disclose a verification function of a program itself executed in one arithmetic processing device. In the technique disclosed in PTL 1, even though the program itself executed in one arithmetic processing device is falsified, it is difficult to detect the falsification. Therefore, the technique disclosed in PTL 1 has room for improvement in terms of easily realizing safe startup of the device.

The present invention has been made in view of the above circumstances, and an object of the present invention is to easily realize safe startup of a control apparatus including a plurality of arithmetic processing devices.

Solution to Problem

In order to solve the above problem, according to the present invention, a control apparatus includes a first arithmetic processing device including a processor that executes a first program, a second arithmetic processing device including a processor that executes a second program, and a storage device that stores the second program. The first arithmetic processing device includes a verification unit that verifies whether or not each of the first program and the second program has been falsified, a first acquisition unit that acquires the second program from the storage device when the verification unit verifies that the first program has not been falsified, and a startup permission notification unit that notifies the second arithmetic processing device of startup permission for permitting the second arithmetic processing device to start up the second program, when the verification unit verifies that the second program has not been falsified. The second arithmetic processing device includes a second acquisition unit that acquires the second program from the storage device, and a startup execution unit that starts up the second program when the startup permission is notified.

Advantageous Effects of Invention

According to the present invention, it is possible to easily realize safe startup of a control apparatus including a plurality of arithmetic processing devices.

Objects, configurations, and advantageous effects other than those described above will be clarified by the descriptions of the following embodiments.

BRIEF DESCRIPTION OF DRAWINGS

FIG. 1 is a diagram illustrating a functional configuration of a control apparatus according to Embodiment 1.

FIG. 4 is a diagram illustrating a functional configuration of a control apparatus according to Embodiment 2.

DESCRIPTION OF EMBODIMENTS

Figure 2:
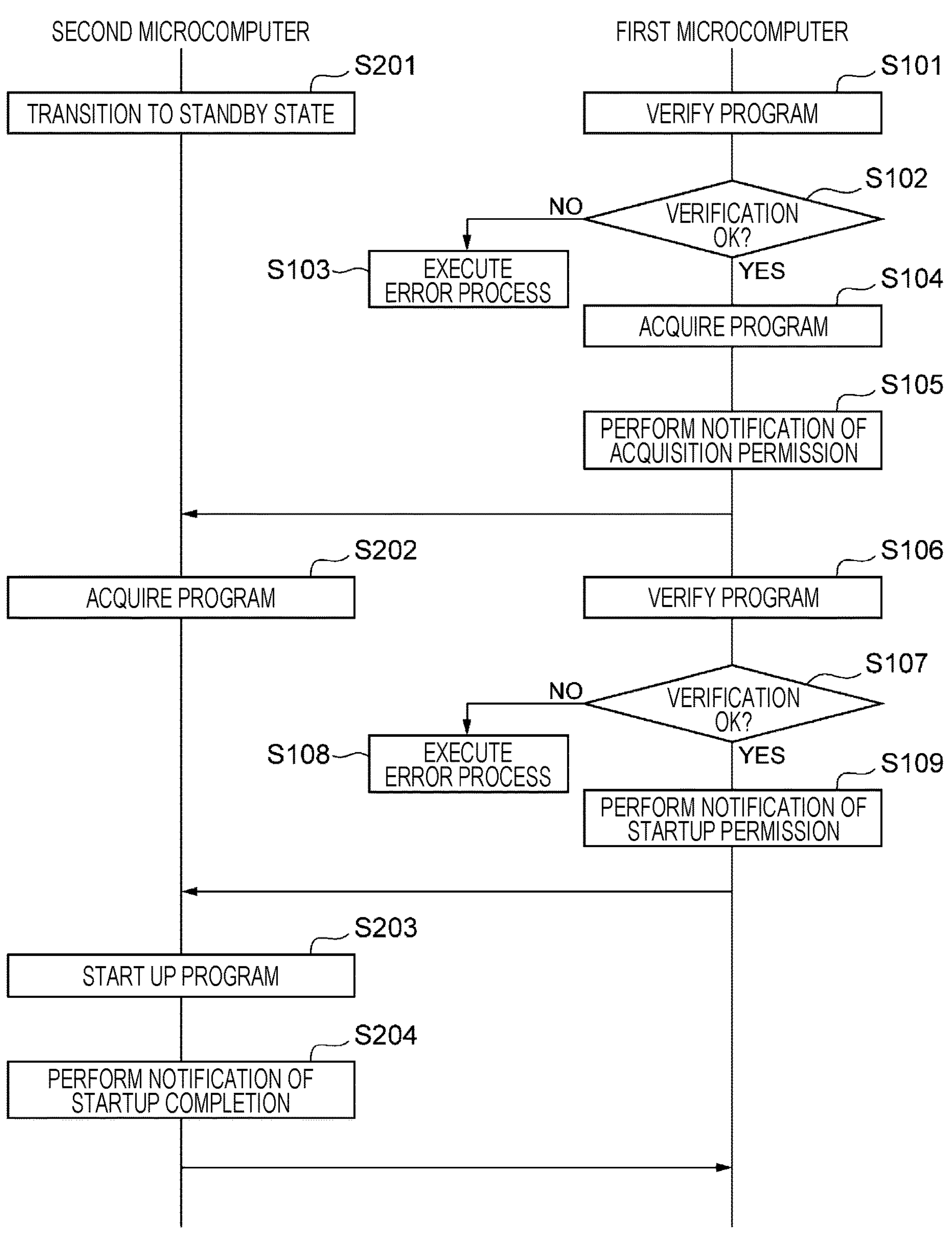
FIG. 2 illustrates a sequence showing a flow of a startup process of the control apparatus illustrated in FIG. 1.

Hereinafter, embodiments of the present invention will be described with reference to the drawings. Components denoted by the same reference signs in the respective embodiments have similar functions in the respective embodiments unless otherwise specified, and the description thereof will be omitted.

Embodiment 1

In the present embodiment, an example of a control apparatus equipped with a secure boot function for verifying the safety of a program when an arithmetic processing device such as a microcomputer is started up will be described. However, the technical idea of the present invention can be widely applied to information security technologies such as an encryption process and an electronic signature verification process.

A control apparatus 5 is an apparatus that electrically controls a control target. The control target of the control apparatus 5 is not particularly limited. The control target of the control apparatus 5 may be a machine or a device having a relatively long product life, such as an automobile. For example, the control apparatus 5 may be configured by an in-vehicle ECU.

FIG. 1 is a diagram illustrating a functional configuration of the control apparatus 5 according to Embodiment 1.

The control apparatus 5 includes a first microcomputer 1, a second microcomputer 2, and a storage device 3. The storage device 3 is connected to each of the first microcomputer 1 and the second microcomputer 2 via a communication bus 4. At this time, the communication bus 4 is physically configured by a plurality of communication buses. The standards of the plurality of communication buses constituting the communication bus 4 may all be the same or different. The standard is, for example, a serial peripheral interface (SPI), a media independent interface (MII), or the like.

The first microcomputer 1 is an example of a "first arithmetic processing device" described in the claims. The second microcomputer 2 is an example of a "second arithmetic processing device" described in the claims.

The first microcomputer 1 includes a main control unit 111, a main program storage unit 112, a main data storage unit 113, and a communication unit 114 which are connected to each other by a bus line 115. In the present embodiment, an area and the bus line 115 to which these components of the first microcomputer 1 belong are also referred to as a "main area 11".

The first microcomputer 1 further includes a secure control unit 123, a secure program storage unit 122, and a secure data storage unit 121 which are connected to each other via a bus line 125. In the present embodiment, an area and the bus line 125 to which these components of the first microcomputer 1 belong are also referred to as a "secure area 12".

The main area 11 is an area other than the secure area 12 in the first microcomputer 1. The secure area 12 is an area having tamper resistance. That is, the first microcomputer 1 includes the secure area 12 having tamper resistance and the main area 11 that is an area other than the secure area 12. In addition, the secure area 12 is an area in which a program and pieces of data can be rewritten.

The bus line 115 of the main area 11 and the bus line 125 of the secure area 12 are not directly connected from the viewpoint of securing safety, but are indirectly connected via the secure control unit 123. Commands and pieces of data are transmitted and received between the main area 11 and the secure area 12 via the secure control unit 123.

The main control unit 111 includes a processor (CPU, MPU, or DSP) and executes a program stored in the main program storage unit 112. Note that the main control unit 111 is an example of a "processor" in the "first arithmetic processing device" described in the claims.

The main program storage unit 112 stores a program executed by the main control unit 111. The main data storage unit 113 stores data used when the main control unit 111 executes a program. Each of the main program storage unit 112 and the main data storage unit 113 is configured by a non-volatile storage device such as a flash memory, an EEPROM, an SSD, an FRAM (registered trademark, the same applies below), or a magnetic disk. Each of the main program storage unit 112 and the main data storage unit 113 may be configured by a plurality of storage devices. The main program storage unit 112 may store programs in a distributed manner in a plurality of storage devices. The main data storage unit 113 may store data in a distributed manner in a plurality of storage devices.

Each of the main program storage unit 112 and the main data storage unit 113 may be a memory having a ROM that is a non-volatile storage device and a RAM that is a volatile storage device. The ROM stores an invariable program. The RAM may be a high-speed and volatile storage device such as a DRAM, and can temporarily store a program executed by the main control unit 111 and data used when the program is executed. The main program storage unit 112 and the main data storage unit 113 may have a portion or the entirety of the main program storage unit 112 and the main data storage unit 113 as constituent elements of each other. Even when there is no clear distinction as a device, the main program storage unit 112 may be a component that stores a program, and the main data storage unit 113 may be a component that stores data.

The main program storage unit 112 stores a main control program 1121, a first verification expected value 1122, a main updating unit 1123, a startup permission notification unit 1124, an acquisition permission notification unit 1125, and a first acquisition unit 1126. The main control program 1121, the main updating unit 1123, the startup permission notification unit 1124, the acquisition permission notification unit 1125, and the first acquisition unit 1126 are programs executed by the main control unit 111, and are programs for realizing the function as the first microcomputer 1 in the control apparatus 5.

In the present embodiment, the program stored in the main program storage unit 112 and executed by the main control unit 111 is also referred to as a "first program". The first program is, for example, the main control program 1121, the main updating unit 1123, the startup permission notification unit 1124, the acquisition permission notification unit 1125, and the first acquisition unit 1126. In the present embodiment, the program stored in a second microcomputer storage area 31 of the storage device 3 and executed by a control unit 21 is also referred to as a "second program". The second program is, for example, a control program 311.

The main control program 1121 is a program for the control apparatus 5 to control a control target, and is a program executed by the main control unit 111 of the first microcomputer 1. A plurality of the main control programs 1121 may be provided to realize a plurality of control functions as the control apparatus 5. The first verification expected value 1122 is a value expected to be calculated in a process of verifying whether or not the first program has been falsified. The first verification expected value 1122 may be stored in a place that can be read by the first microcomputer 1. The first verification expected value 1122 may be stored in any of the main data storage unit 113, the secure data storage unit 121, and the secure program storage unit 122, for example.

When the verification unit 1221 verifies that the first program has not been falsified, the first acquisition unit 1126 acquires the second program and a second verification expected value 312 stored in the second microcomputer storage area 31 from the storage device 3. The acquisition permission notification unit 1125 notifies the second microcomputer 2 of the acquisition permission for permitting the second microcomputer 2 to acquire the second program from the storage device 3, when the verification unit 1221 verifies that the first program has not been falsified. The acquisition permission notification unit 1125 notifies the second microcomputer 2 of the acquisition permission before the startup permission notification unit 1124 notifies the second microcomputer 2 of the startup permission. When the verification unit 1221 verifies that the second program has not been falsified, the startup permission notification unit 1124 notifies the second microcomputer 2 of startup permission for permitting the second microcomputer 2 to start up the second program.

When the verification unit 1221 verifies that an update package has not been falsified, the main updating unit 1123 updates the update target program or data stored in the main program storage unit 112, the main data storage unit 113, or the second microcomputer storage area 31 of the storage device 3 with the update package. Further, when the verification unit 1221 verifies that the update package has not been falsified, the main updating unit 1123 updates the update target program or data stored in the secure program storage unit 122 or the secure data storage unit 121 with the update package in cooperation with the secure updating unit 1223.

The update target is a program or data predetermined as an update target. The update package is a program or data for updating the update target. The update package includes a verification expected value expected to be calculated in the process for verifying whether or not the update package has been falsified. The update package is transmitted from an external device of the control apparatus 5, such as a center server or a terminal, to the control apparatus 5.

Although not particularly illustrated, the main data storage unit 113 stores control data. This control data is data used for processes by the main control program 1121, the main updating unit 1123, the startup permission notification unit 1124, the acquisition permission notification unit 1125, and the first acquisition unit 1126 executed by the main control unit 111, and is data for realizing the function as the first microcomputer 1 in the control apparatus 5. There may be a plurality of pieces of control data according to the application.

The communication unit 114 has a function of causing the first microcomputer 1 to communicate with other components of the control apparatus 5 including the second microcomputer 2 and a function of causing the first microcomputer 1 to communicate with an external device of the control apparatus 5. The communication unit 114 may be configured by a communication module conforming to a standard such as SPI, MII, CAN, CAN FD, Ethernet, or FlexRay. The communication unit 114 may be configured by a plurality of communication units according to the application and the communication method. The communication unit 114 may be shared with a communication module that performs other communication. Note that the communication unit 114 is configured to include an antenna and a modulation/demodulation circuit when performing wireless communication. The communication unit 114 is configured to include a connector and a modulation/demodulation circuit when performing wired communication.

The secure control unit 123 is configured by a secure microcomputer such as an HSM, a SHE, or TPM, or a processor (CPU, MPU, or DSP) called a secure core. The secure control unit 123 executes the program stored in the secure program storage unit 122. The secure control unit 123 has tamper resistance. Note that the HSM, the SHE, or the TPM constituting the secure control unit 123 may be configured to include the secure program storage unit 122 and the secure data storage unit 121.

The secure program storage unit 122 stores the program executed by the secure control unit 123. The secure data storage unit 121 stores data used when the secure control unit 123 executes the program. Each of the secure program storage unit 122 and the secure data storage unit 121 has tamper resistance. Each of the secure program storage unit 122 and the secure data storage unit 121 is configured by a non-volatile storage device such as a flash memory, an EEPROM, an SSD, an FRAM, or a magnetic disk. Each of the secure program storage unit 122 and the secure data storage unit 121 may be configured by a plurality of storage devices. The secure program storage unit 122 may store the program in a distributed manner in a plurality of storage devices. The secure data storage unit 121 may store programs in a distributed manner in a plurality of storage devices.

Each of the secure program storage unit 122 and the secure data storage unit 121 may be a memory having a ROM that is a non-volatile storage device and a RAM that is a volatile storage device. The ROM stores an invariable program. The RAM may be a high-speed and volatile storage device such as a DRAM, and can temporarily store the program executed by the secure control unit 123 and data used when the program is executed. The secure program storage unit 122 and the secure data storage unit 121 may have a portion or the entirety of the secure program storage unit 122 and the secure data storage unit 121 as constituent elements of each other. Even when there is no clear distinction as a device, the secure program storage unit 122 may be a component that stores storing a program, and the secure data storage unit 121 may be a component that stores data.

The secure program storage unit 122 stores the verification unit 1221, an encryption processing unit 1222, and a secure updating unit 1223. The verification unit 1221, the encryption processing unit 1222, and the secure updating unit 1223 are programs executed by the secure control unit 123, and are programs for realizing the security function of the control apparatus 5 mounted on the first microcomputer 1.

The verification unit 1221 verifies whether or not the program stored in the main area 11 has been falsified. That is, the verification unit 1221 verifies whether or not the first program has been falsified. Specifically, the verification unit 1221 acquires a program corresponding to verification range information 1212 in the first program. The verification unit 1221 calculates a verification value from the program corresponding to the verification range information 1212 based on an encryption key 1211 and a predetermined algorithm for calculating a verification value for verifying whether or not the program corresponding to the verification range information 1212 has been falsified. Then, the verification unit 1221 compares the calculated verification value with a first verification expected value 1122. The verification unit 1221 determines that the first program has not been falsified, when the calculated verification value coincides with the first verification expected value 1122, and determines that it is not possible to determine that the first program has not been falsified, when the calculated verification value does not coincide with the first verification expected value 1122.

Furthermore, the verification unit 1221 verifies whether or not the program stored in the second microcomputer storage area 31 of the storage device 3 has been falsified. That is, the verification unit 1221 verifies whether or not the second program has been falsified. Specifically, the verification unit 1221 acquires a program corresponding to the verification range information 1212 in the second program. The verification unit 1221 calculates a verification value from the program corresponding to the verification range information 1212 based on an encryption key 1211 and a predetermined algorithm for calculating a verification value for verifying whether or not the program corresponding to the verification range information 1212 has been falsified. Then, the verification unit 1221 compares the calculated verification value with a second verification expected value 312. The verification unit 1221 determines that the second program has not been falsified, when the calculated verification value coincides with the second verification expected value 312, and determines that it is not possible to determine that the second program has not been falsified, when the calculated verification value does not coincide with the second verification expected value 312.

Furthermore, the verification unit 1221 verifies whether or not the update package has been falsified. Specifically, the verification unit 1221 acquires the verification expected value included in the update package and acquires the program or data corresponding to the verification range information 1212 in the update package. The verification unit 1221 calculates a verification value from the program or data corresponding to the verification range information 1212 based on an encryption key 1211 and a predetermined algorithm for calculating a verification value for verifying whether or not the program or data corresponding to the verification range information 1212 has been falsified. Then, the verification unit 1221 compares the calculated verification value with the verification expected value included in the update package. The verification unit 1221 determines that the update package has not been falsified, when the calculated verification value coincides with the verification expected value included in the update package, and determines that it is not possible to determine that the update package has not been falsified, when the calculated verification value does not coincide with the verification expected value.

Each of the above-described verification processes executed by the verification unit 1221 may be a verification process by a message authentication code (MAC) using a common key, may be a verification process by the Rivest-Shamir-Adleman cryptosystem (RSA) using a public key, or a verification process by an elliptic curve digital signature algorithm (ECDSA) using an electronic signature.

The encryption processing unit 1222 executes an encryption process of encrypting predetermined data or a decryption process of decrypting encrypted data. The secure updating unit 1223 cooperates with the main updating unit 1123 to update the update target program or data stored in the secure program storage unit 122 or the secure data storage unit 121 with the update package. Note that the main updating unit 1123 and the secure updating unit 1223 that update the update target stored in the secure area 12 are examples of an "updating unit" described in the claims.

The secure data storage unit 121 stores the encryption key 1211 and the verification range information 1212. The encryption key 1211 is data of an encryption key used for the verification process executed by the verification unit 1221. A plurality of encryption keys 1211 may be provided according to the application. The verification range information 1212 is information indicating a program or data to be verified by the verification unit 1221. The verification range information 1212 may be address information. For example, the verification range information 1212 used to verify whether or not the first program has been falsified is address information for designating a storage destination of a portion or the entirety of some or all of the programs corresponding to the first program. For example, the verification range information 1212 used to verify whether or not the second program has been falsified is address information for designating a storage destination of a portion or the entirety of some or all of the programs corresponding to the second program. For example, the verification range information 1212 used to verify whether or not the update package has been falsified is address information for designating a storage destination of a portion or the entirety of some or all of the programs in the update package.

Although not particularly illustrated, the secure data storage unit 121 stores secure control data. The secure control data is data used for processes by the verification unit 1221, the encryption processing unit 1222, and the secure updating unit 1223 executed by the secure control unit 123, and is data for realizing the security function of the control apparatus 5 mounted on the first microcomputer 1. There may be a plurality of pieces of secure control data according to the application.

The second microcomputer 2 includes a control unit 21, a program storage unit 22, a data storage unit 23, and a communication unit 24 which are connected to each other by a bus line 25.

The control unit 21 includes a processor (CPU, MPU, or DSP), and executes the program stored in the program storage unit 22 and the control program 311 stored in the second microcomputer storage area 31 of the storage device 3. Note that the control unit 21 is an example of a "processor" in the "second arithmetic processing device" described in the claims.

The program storage unit 22 stores a program executed by the control unit 21. The data storage unit 23 stores data used when the control unit 21 executes the program. Each of the program storage unit 22 and the data storage unit 23 is configured by a non-volatile storage device such as a flash memory, an EEPROM, an SSD, an FRAM, or a magnetic disk. Each of the program storage unit 22 and the data storage unit 23 may be configured by a plurality of storage devices. The program storage unit 22 may store the program in a distributed manner in a plurality of storage devices. The data storage unit 23 may store data in a distributed manner in a plurality of storage devices.

Each of the program storage unit 22 and the data storage unit 23 may be a memory having a ROM which is a non-volatile storage device and a RAM which is a volatile storage device. The ROM stores an invariable program. The RAM may be a high-speed and volatile storage device such as a DRAM, and can temporarily store a program executed by the control unit 21 and data used when the program is executed. The program storage unit 22 and the data storage unit 23 may have a portion or the entirety of the program storage unit 22 and the data storage unit 23 as constituent elements of each other. Even when there is no clear distinction as a device, the program storage unit 22 may be a component that stores a program, and the data storage unit 23 may be a component that stores data.

The program storage unit 22 stores a startup execution unit 221 and a second acquisition unit 222. The startup execution unit 221 and the second acquisition unit 222 are programs executed by the control unit 21, and are programs for realizing the function as the second microcomputer 2 in the control apparatus 5.

The startup execution unit 221 and the second acquisition unit 222 are stored in a one time programmable (OTP) area in order to prevent unauthorized rewriting. The OTP area is a storage area in which a program is written only once, and once the program is written, the program cannot be rewritten to a different program. That is, the second microcomputer 2 has an OTP area in which the program cannot be rewritten in the program storage unit 22. The startup execution unit 221 and the second acquisition unit 222 are stored in the OTP area.

The second acquisition unit 222 acquires the program stored in the second microcomputer storage area 31 of the storage device 3 at a predetermined timing. Specifically, when a notification of the acquisition permission is received from the first microcomputer 1, the second acquisition unit 222 acquires the second program from the second microcomputer storage area 31 of the storage device 3. The second acquisition unit 222 loads and stores the acquired second program to and in a predetermined storage area of the second microcomputer 2. When acquiring the second program from the second microcomputer storage area 31 of the storage device 3, the second acquisition unit 222 may acquire data stored in the second microcomputer storage area 31.

The startup execution unit 221 starts up the program stored in the second microcomputer storage area 31 of the storage device 3 at a predetermined timing. Specifically, when the notification of the startup permission is received from the first microcomputer 1, the startup execution unit 221 starts up the second program acquired from the second microcomputer storage area 31 of the storage device 3. After power is supplied to the control apparatus 5, the startup execution unit 221 transitions the second microcomputer 2 to a standby state until the notification of the acquisition permission is received from the first microcomputer 1. After the second acquisition unit 222 acquires the second program, the startup execution unit 221 transitions the second microcomputer 2 to the standby state until the notification of the startup permission is received from the first microcomputer 1.

Although not particularly illustrated, the data storage unit 23 stores control data. This control data is data used for processes by the control program 311, the startup execution unit 221, and the second acquisition unit 222 executed by the control unit 21, and is data for realizing the function as the second microcomputer 2 in the control apparatus 5. There may be a plurality of pieces of control data according to the application.

The communication unit 24 has a function of causing the second microcomputer 2 to communicate with other components of the control apparatus 5 including the first microcomputer 1 and a function of causing the first microcomputer 1 to communicate with an external device of the control apparatus 5. The communication unit 24 may be configured by a communication module conforming to a standard such as SPI, MII, CAN, CAN FD, Ethernet, or FlexRay. The communication unit 24 may be configured by a plurality of communication units according to the application and the communication method. The communication unit 24 may be shared with a communication module that performs other communication. Note that the communication unit 24 is configured to include an antenna and a modulation/demodulation circuit when performing wireless communication. The communication unit 24 is configured to include a connector and a modulation/demodulation circuit when performing wired communication.

The storage device 3 is configured by a non-volatile storage device such as a flash memory, an EEPROM, an SSD, an FRAM, or a magnetic disk. The storage device 3 has the second microcomputer storage area 31. The second microcomputer storage area 31 stores the control program 311 as the second program and the second verification expected value 312.

The control program 311 is a program for the control apparatus 5 to control a control target, and is a program executed by the control unit 21 of the second microcomputer 2. The control program 311 is loaded in a predetermined storage area of the second microcomputer 2 and executed by the control unit 21 in accordance with the startup execution unit 221. The control program 311 may be stored in a place where both the first microcomputer 1 and the second microcomputer 2 can read the program. The second verification expected value 312 is a value expected to be calculated in the process of verifying whether or not the second program has been falsified. The second verification expected value 312 may be stored in a place that can be read by the first microcomputer 1. The second verification expected value 312 may be stored in any of the main data storage unit 113, the secure data storage unit 121, and the secure program storage unit 122, for example.

Note that the control apparatus 5 may include a plurality of microcomputers having the similar configuration to the second microcomputer 2. In this case, a plurality of control programs 311 and a plurality of second verification expected values 312 are stored in the storage device 3.

FIG. 2 illustrates a sequence showing a flow of the startup process of the control apparatus 5 illustrated in FIG. 1.

In the description with reference to FIG. 2, the execution subject of the program stored in the main program storage unit 112 is the main control unit 111, and the execution subject of the program stored in the secure program storage unit 122 is the secure control unit 123. The execution subject of the program stored in the program storage unit 22 and the second microcomputer storage area 31 is assumed to be the control unit 21.

The arrows illustrated in FIG. 2 indicate conceptual flows of commands and data, and do not limit a communication direction or a command direction. The startup process illustrated in FIG. 2 may include a flow of commands and data other than the arrows illustrated in FIG. 2.

The startup process illustrated in FIG. 2 is started after power is supplied to the control apparatus 5. The power is supplied to the control apparatus 5, for example, in a manner that an ignition switch of a vehicle or the like to be controlled by the control apparatus 5 is turned ON.

In Step S101, the first microcomputer 1 verifies whether or not the program stored in the main area 11 has been falsified, using the verification unit 1221. For example, the first microcomputer 1 acquires the program corresponding to the address indicated by the verification range information 1212, calculates a verification value, and compares the verification value with the first verification expected value 1122. When the calculated verification value coincides with the first verification expected value 1122, the first microcomputer 1 determines that the first program has not been falsified and determines that verification is OK (verification has succeeded). On the other hand, when the calculated verification value does not coincide with the first verification expected value 1122, the first microcomputer 1 cannot determine that the first program has not been falsified and determines that verification is NG (verification has failed).

In Step S102, when determining in Step S101 that verification is OK, the first microcomputer 1 transitions to Step S104. On the other hand, when determining in Step S101 that verification is NG, the first microcomputer 1 transitions to Step S103.

In Step S103, the first microcomputer 1 executes a predetermined error process using the verification unit 1221. For example, as the error process, the first microcomputer 1 re-executes the verification process in Step S101, sets a degeneration operation of limiting a specific function of the first microcomputer 1 to be performed, or entirely stops the startup of the control apparatus 5. Further, the first microcomputer 1 can issue a notification that the verification is NG or that the error process is executed.

In Step S104, the first microcomputer 1 uses the first acquisition unit 1126 to acquire the second program and the second verification expected value 312 stored in the second microcomputer storage area 31 from the storage device 3.

In Step S105, the first microcomputer 1 uses the acquisition permission notification unit 1125 to notify the second microcomputer 2 of the acquisition permission of the second program.

In Step S106, the first microcomputer 1 uses the verification unit 1221 to verify whether or not the second program acquired in Step S104 has been falsified. For example, the first microcomputer 1 acquires the program corresponding to the address indicated by the verification range information 1212, calculates a verification value, and compares the verification value with the second verification expected value 312. When the calculated verification value coincides with the second verification expected value 312, the first microcomputer 1 determines that the second program has not been falsified and determines that verification is OK (verification has succeeded). On the other hand, when the calculated verification value does not coincide with the second verification expected value 312, the first microcomputer 1 cannot determine that the second program has not been falsified and determines that verification is NG (verification has failed).

In Step S107, when determining in Step S106 that verification is OK, the first microcomputer 1 transitions to Step S109. On the other hand, when determining in Step S106 that verification is NG, the first microcomputer 1 transitions to Step S108.

In Step S108, the first microcomputer 1 executes a predetermined error process using the verification unit 1221. For example, as the error process, the first microcomputer 1 re-executes the verification process in Step S106, sets the degeneration operation of limiting a specific function of the second microcomputer 2 to be performed, or entirely stops the startup of the control apparatus 5. Further, the first microcomputer 1 can issue a notification that the verification is NG or that the error process is executed.

In Step S109, the first microcomputer 1 uses the startup permission notification unit 1124 to notify the second microcomputer 2 of the startup permission of the second microcomputer 2.

In Step S201, the second microcomputer 2 transitions to the standby state until the acquisition permission of the second program is received from the first microcomputer 1 by using the startup execution unit 221.

In Step S202, when the acquisition permission of the second program is received from the first microcomputer 1, the second microcomputer 2 uses the second acquisition unit 222 to acquire the second program stored in the second microcomputer storage area 31 from the storage device 3. Then, the second microcomputer 2 transitions to the standby state until the notification of the startup permission of the second program is received from the first microcomputer 1 by using the startup execution unit 221.

In Step S203, when the notification of the startup permission of the second program is received from the first microcomputer 1, the second microcomputer 2 uses the startup execution unit 221 to start up the second program acquired in Step S202.

In Step S204, when the startup of the second program has completed, the second microcomputer 2 notifies the first microcomputer 1 of the completion of the startup of the second microcomputer 2 by using the startup execution unit 221. With the processing illustrated in FIG. 2, the control apparatus 5 can be safely started up.

Note that Step S105 in FIG. 2 only needs to be executed after Step S102 and before Step S109, and does not need to be executed between Step S104 and Step S106. Step S105 may be executed, for example, between Step S102 and Step S104, or between Step S107 and Step S109.

Figure 3:
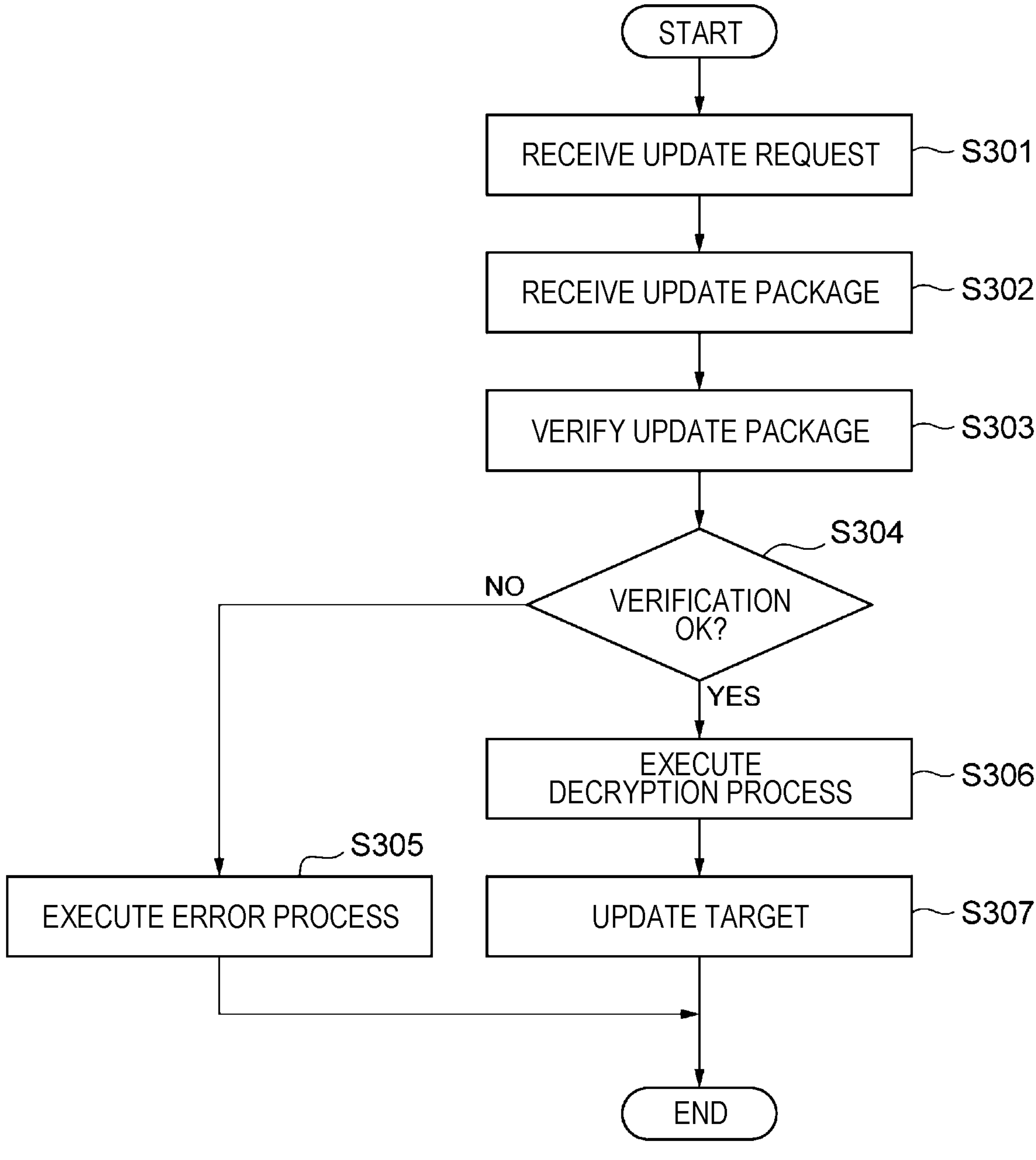
FIG. 3 is a flowchart illustrating a flow of an update process of the control apparatus illustrated in FIG. 1.

FIG. 3 is a flowchart illustrating a flow of an update process of the control apparatus 5 illustrated in FIG. 1.

The update process illustrated in FIG. 3 starts when an update request for the program or data of the control apparatus 5 is transmitted from an external device of the control apparatus 5.

In Step S301, the control apparatus 5 receives the update request from the external device via the communication unit 114 or the communication unit 24. The control apparatus 5 transitions to the standby state in which the control apparatus 5 waits until receiving the update package, by using the main updating unit 1123. Before transitioning to the standby state, the control apparatus 5 may execute predetermined device authentication and verify that the external device that is the transmission source of the update request is an authorized device.

In Step S302, the control apparatus 5 receives the update package from the external device by using the main updating unit 1123, and stores the update package in a predetermined storage area. The predetermined storage area for storing the update package may be provided, for example, in either or both of the main data storage unit 113 and the storage device 3. The predetermined storage area for storing the update package may be provided in a volatile storage device or a non-volatile storage device.

In Step S303, the first microcomputer 1 uses the verification unit 1221 to verify whether or not the update package received in Step S302 has been falsified. For example, the first microcomputer 1 acquires the program corresponding to the address indicated by the verification range information 1212, calculates a verification value, and compares the verification value with an update package verification expected value. When the calculated verification value coincides with the update package verification expected value, the first microcomputer 1 determines that the update package has not been falsified and determines that verification is OK (verification has succeeded). On the other hand, when the calculated verification value does not coincide with the update package verification expected value, the first microcomputer 1 cannot determine that the update package has not been falsified and determines that verification is NG (verification has failed).

In Step S304, when determining in Step S303 that verification is OK, the first microcomputer 1 transitions to Step S306. On the other hand, when determining in Step S303 that verification is NG, the first microcomputer 1 transitions to Step S305.

In Step S305, the first microcomputer 1 executes a predetermined error process using the verification unit 1221. For example, as the error process, the first microcomputer 1 re-executes the verification process in Step S303, sets the update of the specific function of the first microcomputer 1 or the second microcomputer 2 to be limited, or entirely stops the startup of the control apparatus 5. Further, the first microcomputer 1 can issue a notification that the verification is NG or that the error process is executed.

In Step S306, the first microcomputer 1 uses the encryption processing unit 1222 to decrypt the update package based on the encryption key 1211 used for concealment and a predetermined algorithm. For example, the first microcomputer 1 may execute an encryption process and a decryption process using AES-CBC. The first microcomputer 1 may execute a decryption process based on the update package encryption key 1211 stored in the secure data storage unit 121 accessible only by the secure control unit 123.

In Step S307, the first microcomputer 1 uses the main updating unit 1123 (and the secure updating unit 1223) to store the update package decrypted in Step S306 in the storage destination of the update target program or data, thereby updating the update target. The update package may include address information for designating the storage destination of the update target. The update package may be configured by a plurality of update programs or update data. An ID of the storage destination may be assigned to each of the plurality of update programs or update data. For example, when the update package is configured by an update program for which the verification unit 1221 is set as the update target and update data for which the encryption key 1211 is set as the update target, an ID corresponding to address information of the verification unit 1221 may be assigned to the update program, and an ID corresponding to address information of the encryption key 1211 may be assigned to the update program. With the processing illustrated in FIG. 3, the control apparatus 5 can safely update the update target.

As described above, the control apparatus 5 according to Embodiment 1 is a control apparatus that includes the first microcomputer 1 including the processor that executes the first program, the second microcomputer 2 including the processor that executes the second program, and the storage device 3 that stores the second program. The first microcomputer 1 includes the verification unit 1221 that verifies whether or not each of the first program and the second program has been falsified, and the first acquisition unit 1126 that acquires the second program from the storage device 3 when the verification unit 1221 verifies that the first program has not been falsified. The first microcomputer 1 further includes the startup permission notification unit 1124 that notifies the second microcomputer 2 of startup permission for permitting the second microcomputer 2 to start up the second program when the verification unit 1221 verifies that the second program has not been falsified. The second microcomputer 2 includes a second acquisition unit 222 that acquires the second program from the storage device 3 and a startup execution unit 221 that starts up the second program, when a notification of a startup permission is issued.

With such a configuration, in the control apparatus 5 in Embodiment 1, at the time of startup, the first microcomputer 1 having a program verification function can verify the first program itself executed by the first microcomputer 1 having the program verification function in addition to the second program executed by the second microcomputer 2 not having the program verification function at the time of startup. Then, the first microcomputer 1 can verify the second program based on the function of the first program checked not to be falsified, and can permit startup of the second program checked not to be falsified. Therefore, the control apparatus 5 in Embodiment 1 can appropriately detect and handle falsification of either the first program or the second program even when the program verification function is not mounted on all of the first microcomputer 1 and the second microcomputer 2. Therefore, the control apparatus 5 in Embodiment 1 can easily realize safe startup of the control apparatus including the plurality of arithmetic processing devices.

Further, in the control apparatus 5 in Embodiment 1, the first microcomputer 1 has the secure area 12 having tamper resistance, and the second microcomputer 2 has the OTP area in which the program cannot be rewritten. The verification unit 1221 is stored in the secure area 12, and the second acquisition unit 222 and the startup execution unit 221 are stored in the OTP area.

With such a configuration, in Embodiment 1, the first microcomputer 1 can verify the first program based on the verification unit 1221 stored in the secure area 12 in which tamper resistance such as an HSM is secured at the time of startup. Then, the first microcomputer 1 can verify the second program based on the function of the first program checked not to be falsified, and can permit startup of the second program checked not to be falsified. On the other hand, in Embodiment 1, the second microcomputer 2 can acquire the second program using the second acquisition unit 222 stored in the unfalsifiable OTP area. When the startup of the second program is permitted, the second microcomputer 2 can start up the second program using the startup execution unit 221 stored in the unfalsifiable OTP area. Therefore, the control apparatus 5 in Embodiment 1 can reliably prevent the verification unit 1221 that can implement the security function of the control apparatus 5, and the second acquisition unit 222 and the startup execution unit 221 related to the startup of the second program from being falsified. Therefore, the control apparatus 5 of the first embodiment can further improve the safety at the time of startup of the control apparatus including the plurality of arithmetic processing devices even if the security function with high security strength such as HSM is not installed in all of the first microcomputer 1 and the second microcomputer 2.

Further, in the control apparatus 5 in Embodiment 1, after the second acquisition unit 222 acquires the second program, the startup execution unit 221 transitions the second microcomputer 2 to the standby state until the notification of the startup permission of the second program is issued.

With such a configuration, in the control apparatus 5 in Embodiment 1, it is possible to reliably prevent an occurrence of an unauthorized situation in which the second microcomputer 2 starts up an unauthorized program after acquisition of the second program and before notification of startup permission. Therefore, the control apparatus 5 in Embodiment 1 can further improve safety at the time of startup of the control apparatus including the plurality of arithmetic processing devices.

Furthermore, in the control apparatus 5 in Embodiment 1, the first microcomputer 1 includes the acquisition permission notification unit 1125 that notifies the second microcomputer 2 of the acquisition permission for permitting the second microcomputer 2 to acquire the second program from the storage device 3 when the verification unit 1221 verifies that the first program has not been falsified. The acquisition permission notification unit 1125 notifies the second microcomputer 2 of the acquisition permission before the startup permission notification unit 1124 notifies the second microcomputer 2 of the startup permission. When the notification of the acquisition permission is received, the second acquisition unit 222 acquires the second program from the storage device 3.

With such a configuration, when it is checked that the first program has not been falsified, the second microcomputer 2 in Embodiment 1 can acquire the second program before notification of startup permission of the second program and start the second program immediately after notification of the startup permission. Therefore, the control apparatus 5 in Embodiment 1 can easily realize safe and high-speed startup of the control apparatus including the plurality of arithmetic processing devices.

Further, in the control apparatus 5 in Embodiment 1, the startup execution unit 221 transitions the second microcomputer 2 to the standby state after power is supplied to the control apparatus 5 until the notification of the acquisition permission of the second program is issued.

With such a configuration, in the control apparatus 5 in Embodiment 1, it is possible to reliably prevent the occurrence of an unauthorized situation in which the second microcomputer 2 activates the falsified program during a period from power-on of the control apparatus 5 to notification of the acquisition permission. Therefore, the control apparatus 5 in Embodiment 1 can further improve safety at the time of startup of the control apparatus including the plurality of arithmetic processing devices.

Further, in the control apparatus 5 in Embodiment 1, the secure area 12 is an area where the program can be rewritten, and the first microcomputer 1 includes the main updating unit 1123 and the secure updating unit 1223 that update the update target stored in the secure area 12 with the update package. The verification unit 1221 verifies whether or not the update package has been falsified. When the verification unit 1221 verifies that the update package has not been falsified, the main updating unit 1123 and the secure updating unit 1223 update the update target with the update package.

With such a configuration, the control apparatus 5 in Embodiment 1 can update the algorithm of the verification unit 1221 and the data of the encryption key 1211 stored in the secure area 12.

Here, the control apparatus 5 may be a control apparatus of a machine or a device having a relatively long product life, such as an automobile. For example, when the control apparatus 5 is configured by an in-vehicle ECU, traveling control of an automobile is relevant to human life. Therefore, the control apparatus 5 needs to continuously secure safety of the traveling control for a long period of time exceeding 10 years. On the other hand, in an operation period of the control apparatus 5 over a long period of time, there is a concern that an algorithm and data constituting the verification function of a program related to traveling control are compromised. When these algorithms and data are compromised, the algorithms and data should be updated to safe algorithms and data. However, when the program verification function is stored in the OTP area as in PTL 1, it is not possible to update these compromised algorithms and data to safe algorithms and data. As a result, in the control apparatus in which the program verification function is stored in the OTP area as in PTL 1, when a machine or the like having a relatively long product life is to be controlled, it is difficult to realize safe startup over a long period of the product life.

On the other hand, in the control apparatus 5 in Embodiment 1, it is possible to update the algorithm of the verification unit 1221 such as HSM and the data of the encryption key 1211 stored in the secure area 12 in which tamper resistance is secured. As a result, the control apparatus 5 in Embodiment 1 can update the algorithm of the verification unit 1221 and the data of the encryption key 1211 to a safe algorithm and data before the algorithm and the data are compromised. Therefore, even if a machine or the like having a relatively long product life is to be controlled, the control apparatus 5 in Embodiment 1 can realize safe startup for a long period of time over the product life.

Embodiment 2

A control apparatus 5 according to Embodiment 2 will be described with reference to FIGS. 4 and 5. In the control apparatus 5 in Embodiment 2, the description of the similar configuration and operation as those in Embodiment 1 will be omitted.

FIG. 4 is a diagram illustrating a functional configuration of the control apparatus 5 according to Embodiment 2. FIG. 5 illustrates a sequence showing a flow of a startup process of the control apparatus 5 illustrated in FIG. 4. The startup process illustrated in FIG. 5 corresponds to the startup process illustrated in FIG. 2 and is started after power is supplied to the control apparatus 5.

In the control apparatus 5 in Embodiment 2, as in Embodiment 1, the verification unit 1221 is stored in the secure area 12, and the second acquisition unit 222 and the startup execution unit 221 are stored in the OTP area of the second microcomputer 2.

In the control apparatus 5 in Embodiment 2, unlike Embodiment 1, the storage device 3 may store not only the second program but also the first program. Specifically, as illustrated in FIG. 4, the main control program 1121, the main updating unit 1123, the startup permission notification unit 1124, and the acquisition permission notification unit 1125 in Embodiment 2 may be stored in the first microcomputer storage area 32 of the storage device 3 as the first program. The first verification expected value 1122 in Embodiment 2 may also be stored in the first microcomputer storage area 32 of the storage device 3.

In addition, in the control apparatus 5 in Embodiment 2, unlike Embodiment 1, the main program storage unit 112 may have the OTP area in which the program cannot be rewritten, and the first acquisition unit 1126 may be stored in the OTP area. Then, the first acquisition unit 1126 in Embodiment 2 may acquire not only the second program and the second verification expected value 312 from the storage device 3 but also the first program and the first verification expected value 1122 from the storage device 3.

Figure 5:
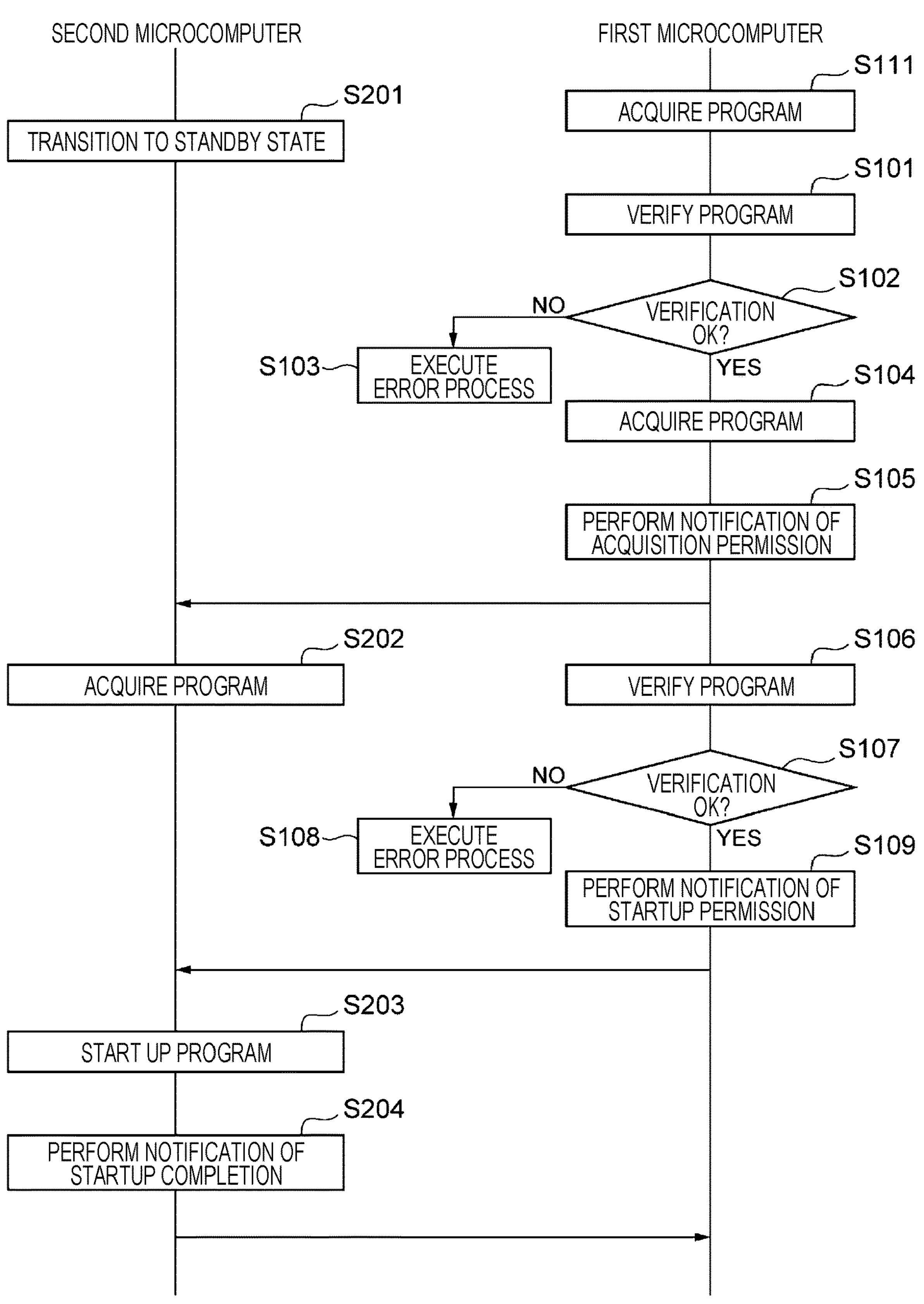
FIG. 5 illustrates a sequence showing a flow of a startup process of the control apparatus illustrated in FIG. 4.

Specifically, as shown in Step S111 of FIG. 5, the first microcomputer 1 in Embodiment 2 uses the first acquisition unit 1126 to acquire the first program from the first microcomputer storage area 32 of the storage device 3 after power is supplied to the control apparatus 5 and before Step S101. Then, the first microcomputer 1 in Embodiment 2 may execute Steps S101 to S109 similar to those of Embodiment 1. The second microcomputer 2 in Embodiment 2 may execute Steps S201 to S204 similar to those in Embodiment 1.

In Step S111 in FIG. 5, the first microcomputer 1 in Embodiment 2 can acquire both the first program and the second program using the first acquisition unit 1126. In this case, the first microcomputer 1 in Embodiment 2 can omit Step S104. In this case, the first microcomputer 1 in Embodiment 2 can notify the second microcomputer 2 of the acquisition permission of the second program by executing Step S105 immediately after it is verified that the first program has not been falsified (immediately after Step S102: YES).

As described above, in the control apparatus 5 in Embodiment 2, the verification unit 1221 is stored in the secure area 12, and the first acquisition unit 1126, the second acquisition unit 222, and the startup execution unit 221 are stored in the OTP area. Similarly to Embodiment 1, the control apparatus 5 in Embodiment 2 can reliably prevent the verification unit 1221 that can realize the security function of the control apparatus 5, and the first acquisition unit 1126, the second acquisition unit 222, and the startup execution unit 221 related to the start of the first program and the second program from being falsified. Further, in the control apparatus 5 in Embodiment 2, even when the capacity of the first program increases in the future, it is possible to easily cope with the increase only by replacing the storage device 3 having higher expandability than the first microcomputer 1 with a storage device having a larger capacity. Therefore, the control apparatus 5 in Embodiment 2 can easily and continuously realize safe startup of the control apparatus including the plurality of arithmetic processing devices.

[Others]

The present invention is not limited to the above embodiments, and various modification examples may be provided. For example, the above embodiments have been described in detail in order to explain the present invention in an easy-to-understand manner, and the above embodiments are not necessarily limited to a case including all the described configurations. Further, some components in one embodiment can be replaced with the components in another embodiment, and the configuration of another embodiment can be added to the configuration of one embodiment. Regarding some components in the embodiments, other components can be added, deleted, and replaced.

Some or all of the configurations, functions, processing units, processing means, and the like may be realized by hardware by being designed with an integrated circuit, for example. Further, the above-described respective components, functions, and the like may be realized by software by the processor interpreting and executing a program for realizing the respective functions. Information such as a program, a table, and a file, that realizes each function can be stored in a memory, a recording device such as a hard disk and an SSD, or a recording medium such as an IC card, an SD card, and a DVD.

Control lines and information lines considered necessary for the descriptions are illustrated, and not all the control lines and the information lines in the product are necessarily shown. In practice, it may be considered that almost all components are connected to each other.

REFERENCE SIGNS LIST

1 first microcomputer (first arithmetic processing device)
111 main control unit (processor)
1123 main updating unit
1124 startup permission notification unit
1125 acquisition permission notification unit
1126 first acquisition unit
12 secure area
1221 verification unit
1223 secure updating unit
2 second microcomputer (second arithmetic processing device)
21 control unit (processor)
221 startup execution unit
222 second acquisition unit
3 storage device
5 control apparatus

The invention claimed is:

1. A control apparatus comprising:

a first arithmetic processing device for executing a first program, the first arithmetic processing device comprising a secure area having tamper resistance;

a second arithmetic processing device for executing a second program in accordance with one or more permissions from the first arithmetic processing device, the second arithmetic processing device comprising a one-time programmable (OTP) area in which rewriting of a program is not possible; and a storage device for storing the second program, wherein the first arithmetic processing device comprises one or more processors coupled with memory, configured to:

verify, via a verification unit of the first arithmetic processing device that is stored in the secure area, whether the first program has been falsified, responsive to verifying that the first program has not been falsified, transmit a first notification to the second arithmetic processing device and acquire, via a first acquisition unit of the first arithmetic processing device, the second program from the storage device, the first notification comprising an acquisition permission for permitting the second arithmetic processing device to acquire the second program from the storage device, verify, subsequent to acquiring the second program, whether the second program has been falsified, and responsive to verifying that the second program has not been falsified, transmit a second notification to the second arithmetic processing device, the second notification comprising a startup permission for permitting the second arithmetic processing device to start up the second program, and wherein the second arithmetic processing device:

(i) acquires, via a second acquisition unit of the second arithmetic processing device that is stored in the OTP area, responsive to receiving the first notification comprising the acquisition permission, the second program from the storage device subsequent to the first arithmetic processing device verifying the first program and before the first arithmetic processing device verifying the second program, and (ii) starts up, via a startup execution unit of the second arithmetic processing device that is stored in the OTP area, the second program in response to receiving the second notification comprising the startup permission issued by the first arithmetic processing device.

2. The control apparatus according to claim 1, wherein the first arithmetic processing device is configured to transition the second arithmetic processing device to a standby state until the second notification of the startup permission is issued after the second arithmetic processing device acquires the second program.

3. The control apparatus according to claim 1, wherein the secure area is an area in which rewriting of a program is possible, and the first arithmetic processing device is configured to:

update an update target stored in the secure area with an update package, verify whether the update package has been falsified, and update the update target with the update package when verified that the update package has not been falsified.

4. The control apparatus according to claim 1, wherein the first arithmetic processing device is configured to:

notify the second arithmetic processing device of an acquisition permission for permitting the second arithmetic processing device to acquire the second program from the storage device, when verified that the first program has not been falsified, and notify the second arithmetic processing device of the acquisition permission before notifying the second arithmetic processing device of the startup permission, wherein the second arithmetic processing device acquires the second program from the storage device when a notification of the acquisition permission is issued.

5. The control apparatus according to claim 4, wherein the first arithmetic processing device is configured to transition the second arithmetic processing device to a standby state until the notification of the acquisition permission is issued after power is supplied to the control apparatus.

6. The control apparatus according to claim 1, wherein the first arithmetic processing device comprises the secure area and a second OTP area in which rewriting of a program is not possible, the storage device stores the first program and the second program, and the first acquisition unit of the first arithmetic processing device is stored in the second OTP area of the first arithmetic processing device which acquires the first program from the storage device.

* * * * *